US011961638B2

(12) United States Patent
Guo et al.

(10) Patent No.: US 11,961,638 B2
(45) Date of Patent: Apr. 16, 2024

(54) CABLE AND CABLE ASSEMBLY

(71) Applicant: Tyco Electronics (Shanghai) Co., Ltd., Shanghai (CN)

(72) Inventors: Zhiwei (Jack) Guo, Dongguan (CN); Hainan (Harlan) Lu, Dongguan (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/961,736

(22) Filed: Oct. 7, 2022

(65) Prior Publication Data

US 2023/0114286 A1 Apr. 13, 2023

(30) Foreign Application Priority Data

Oct. 8, 2021 (CN) .......................... 202111173710.0

(51) Int. Cl.

*H01B 7/02* (2006.01)
*H01B 7/18* (2006.01)
*H01B 11/00* (2006.01)

(52) U.S. Cl.

CPC ............ *H01B 7/0216* (2013.01); *H01B 7/18* (2013.01); *H01B 11/002* (2013.01)

(58) Field of Classification Search

CPC ... H01B 9/02; H01B 9/04; H01B 9/06; H01B 9/08; H01B 9/10

USPC ........ 174/102 R, 102 SP, 106 R, 113 R, 115, 174/116, 117 R, 117 F, 117 FF

See application file for complete search history.

(56) References Cited

U.S. PATENT DOCUMENTS 5,177,098 A * 1/1993 Benoit .................. A01N 53/00 514/521
7,479,601 B1 * 1/2009 Cases .................. H01B 11/203 174/102 R
10,204,717 B2 * 2/2019 Tsujino ................ H01B 7/0241
2004/0026101 A1 * 2/2004 Ochi .................. H01B 11/1091 174/36
2015/0000954 A1 * 1/2015 Nonen .................. H01B 11/20 174/103

* cited by examiner

*Primary Examiner* — William H. Mayo, III
(74) *Attorney, Agent, or Firm* — Barley Snyder

(57) ABSTRACT

A cable includes a pair of conductors extending longitudinally and spaced apart from each other, an inner insulating layer circumferentially wrapped around an outside of the conductors and fixing the conductors, a conductive shielding layer circumferentially wrapped around an outside of the inner insulating layer, and an outer insulating layer circumferentially wrapped around an outer peripheral surface of the conductive shielding layer. At least one of the conductive shielding layer and the outer insulating layer includes a pair of diametrically opposed circumferential halves. Each circumferential half surrounds a part of a circumference of the inner insulating layer and extends longitudinally.

20 Claims, 3 Drawing Sheets

CABLE AND CABLE ASSEMBLY

CROSS-REFERENCE TO RELATED APPLICATION

This application claims the benefit of the filing date under 35 U.S.C. § 119(a)-(d) of Chinese Patent Application No. 202111173710.0, filed on Oct. 8, 2021.

FIELD OF THE INVENTION

The present invention relates generally to a cable, and more particularly, to a cable capable of data transmission at a higher data transmission rate, and a cable assembly including the cable.

BACKGROUND

A conventional structure of a data transmission cable mainly comprises a pair of insulated conductors, a conductive shielding layer wrapping around the insulated conductors and a ground wire, and an outer insulating layer wrapping around an outside of the conductive shielding layer. However, a high-frequency test bandwidth that the conventional structure can achieve is low, which cannot meet the requirements of higher-frequency data transmission, and the high-frequency performance is unstable. Furthermore, it is usually necessary to wind the outer insulating layer and/or the shielding layer turn by turn, resulting in low production efficiency.

SUMMARY

A cable includes a pair of conductors extending longitudinally and spaced apart from each other, an inner insulating layer circumferentially wrapped around an outside of the conductors and fixing the conductors, a conductive shielding layer circumferentially wrapped around an outside of the inner insulating layer, and an outer insulating layer circumferentially wrapped around an outer peripheral surface of the conductive shielding layer. At least one of the conductive shielding layer and the outer insulating layer includes a pair of diametrically opposed circumferential halves. Each circumferential half surrounds a part of a circumference of the inner insulating layer and extends longitudinally.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
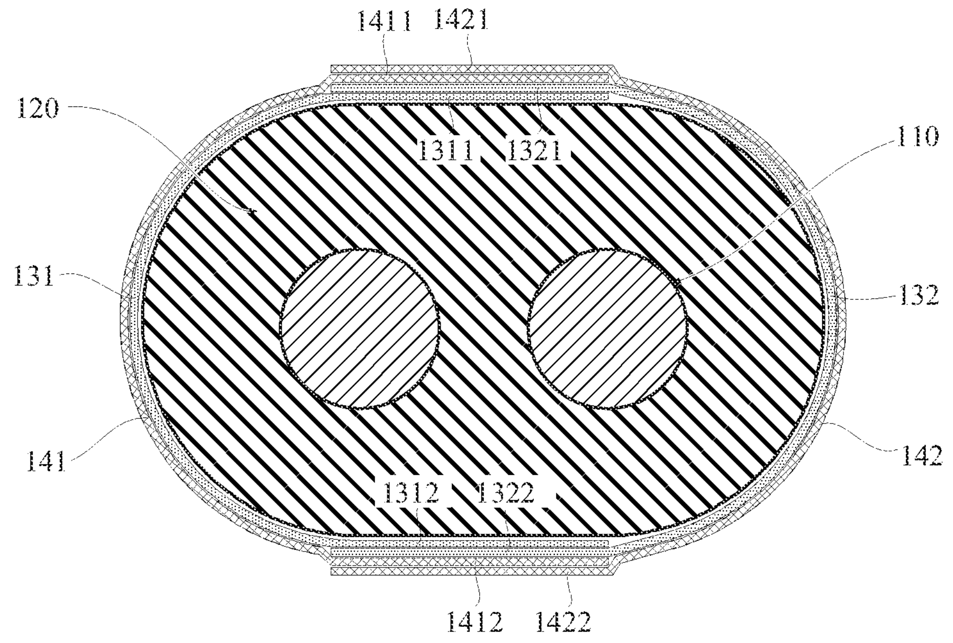
FIG. 1 is a radial sectional view of a cable according to an embodiment.

Embodiments of the present disclosure will be described hereinafter in detail taken in conjunction with the accompanying drawings. In the description, the same or similar parts are indicated by the same or similar reference numerals. The description of each of the embodiments of the present disclosure hereinafter with reference to the accompanying drawings is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

As shown in FIGS. 1-4, according to exemplary embodiments of the present disclosure, there is provided a cable, such as a twinaxial cable or a differential cable, for stable data transmission at higher transmission rates, such as a frequency bandwidth of up to 60 GHz or higher.

As shown, the cable according to the embodiments of the present disclosure comprises at least two conductors 110 for transmitting signals or data, which are arranged to extend longitudinally and be spaced apart from each other. As an example, the conductor 110 can be made of a high-conductivity material such as a copper conductor, a silver-plated wire, and its diameter is, for example, 0.20 mm or more.

In the exemplary embodiments shown in FIGS. 1-4, the cable further comprises an inner insulating layer 120, a conductive shielding layer 130, and an outer insulating layer 140 which are sequentially arranged from inside to outside. The inner insulating layer 120 is circumferentially wrapped around an outside of the at least two conductors 110 so as to fix the at least two conductors 110. The conductive shielding layer 130 is circumferentially wrapped around an outside of the inner insulating layer 120 to provide a signal shielding function for the cable. As an example, the inner or the outer insulating layer 120, 140 may be made of an insulating material such as polyester, polypropylene, polyethylene terephthalate ("PET" for short).

In a conventional cable, the insulating layer is wound around or bonded to the outside of each conductor to form an insulated core wire, and outer peripheries of the insulating layers of the adjacent insulated core wires are abutted against each other. There is a gap between the adjacent insulated core wires, which causes the cable structure to be easily deformed or the core wire to be easily displaced, thus the data transmission performance is unstable.

Compared with the conventional cable, in some exemplary embodiments of the present disclosure, all conductors 110 of the same cable may be wrapped by a single inner insulating layer 120, the material of the inner insulating layer 120 is filled between the wrapped conductors 110, and the inner insulating layer 120 and all conductors 110 wrapped therein form a stable integrated structure, which can ensure that the conductors 110 will not be displaced and the cable structure will not be deformed or less deformed in use, for example during use in a bent state, and the performance stability of the cable will be improved.

In some embodiments, the inner insulating layer 120 is a single extruded layer that wraps around all conductors 110 along a longitudinal length of the at least two conductors 110. The inner insulating layer 120 may be made of insulating polymer material. For example, the inner insulating layer 120 is formed over the at least two conductors 110 by a single extrusion step using an insulating material, such as polyolefin, polytetrafluoroethylene (PTFE), polyethylene terephthalate ("PET" for short), in the extrusion process. The extruded layer is, for example, a continuous insulating layer 120 extending longitudinally over the outer peripheral surface of the conductors 110. The extruded layer may be integrally and efficiently formed over the outer peripheral surface of the conductors 110 by the extrusion process.

In addition, in the conventional cable, the conductive shielding layer 130 surrounds the inner insulating layer 120 in the form of a complete loop or tape in a circumferential direction, and usually does not fit over the internal structure very well. In addition, an insulating tape or a Mylar sheet is conventionally wound around an outside of the conductive shielding layer 130 in a longitudinal direction, the winding is time-consuming and inefficient, and there is a winding or wrapping pitch and a return loss with the insulating tape or the Mylar sheet, thus, the high-frequency test bandwidth of the conventional cable with this structure can only reach about 40 GHz, and the performance of the cables is unstable.

According to an exemplary embodiment of the present disclosure, at least one of the conductive shielding layer 130 and the outer insulating layer 140 comprises two circumferential halves each circumferentially wrapped around a part of a circumference of the inner insulating layer 120 and extending longitudinally, the two circumferential halves are, for example, arranged to be diametrically opposed and combined to completely encircle the internal structure. In other words, instead of the full longitudinal wrapping or full wrapping arrangement of the conductive shielding layer or the outer insulating layer in the conventional cable, the exemplary embodiments of the present disclosure proposes a conductive shielding layer 130 and/or an outer insulating layer 140 in the form of a semi-longitudinal wrapping, which includes two halves circumferentially wrapped around the internal structure (for example, the internal insulating layer 120, the conductive shielding layer 130, a ground wire, etc.) in the circumferential direction, each half wrapping around at least half of the circumference of the corresponding internal structure in the longitudinal direction. As an example, the circumferential halves of the conductive shielding layer 130 may comprise a metallic shielding layer or tape, and the circumferential halves of the outer insulating layer 140 may comprise a polyester tape or layer.

The semi-longitudinal wrapping arrangement eliminates the conventional wrapping structure, so that the conductive shielding layer 130 and/or the outer insulating layer 140 can better fit over the internal structure, and the overall return loss caused by the wrapping structure is eliminated, thereby the frequency bandwidth of the cable is increased from e.g. 40 GHz to 60 GHz or even higher to meet the frequency bandwidth of 60 GHz required by, for example, a 224 Gbps high-speed connector. As an example, a mold may be used to perform the fitting operation of the conductive shielding layer 130 and/or the outer insulating layer 140 in the form of semi-longitudinal wrapping, for example, the wrapping material of the conductive shielding layer 130 and/or the outer insulating layer 140 is supplied to the mold, and while the semi-finished product (such as the conductor 110 already wrapped with the inner insulating layer 120 and/or the conductive shielding layer 130) travels longitudinally, the wrapping material of the conductive shielding layer 130 is fitted (e.g., bonded by hot-melting or by an adhesive) over the inner insulating layer 120, or the wrapping material of the outer insulating layer 140 is fitted (for example, bonded by hot-melting or by an adhesive) over the conductive shielding layer 130 using the mold. Removing the wrapping structure may also eliminate the limitation of the production efficiency due to the wrapping speed of a wrapping machine. For example, in one example, the production speed can be increased from 3 m/min to 20-50 m/min (for example, compared with a conventional 112 Gbps cable made with a 2.4 mm pitch and a wrapping speed of 1300 R/min). Thus, according to the exemplary embodiments of the present disclosure, the production efficiency of the cable can be significantly improved, the above-mentioned pitch can be eliminated, and the performance of the cable can be significantly improved, for example, the high-frequency test bandwidth of the cable can be increased to a higher frequency, such as 60 GHz or higher, so that the cable can be used as a cable suitable for data transmission at higher rates.

As an example of the semi-longitudinal wrapping arrangement, each circumferential half may circumferentially surround at least half the circumference of the internal structure (for example, the inner insulating layer 120 or the conductive shielding layer 130) of the cable, such that the two diametrically opposed circumferential halves are combined to encircle the entire circumference of the internal structure (for example, the inner insulating layer 120 or the conductive shielding layer 130). Each circumferential half may be a continuous layer extending longitudinally, or comprise a plurality of longitudinal segments having a length significantly greater than the aforementioned pitch of the conventional cable.

In the illustrated embodiment, the two diametrically opposed circumferential halves at least partially overlap in the circumferential direction of the inner insulating layer 120 to form a closed loop. For example, the two diametrically opposed circumferential halves partially overlap at positions on two diametrically opposed sides of the inner insulating layer 120.

Specific arrangement of the conductive shielding layer 130 and the outer insulating layer 140 according to the exemplary embodiments of the present disclosure are described in detail below with reference to the accompanying drawings.

The conductive shielding layer 130 is wrapped around the outer peripheral surface of the inner insulating layer 120 and is wound around the outside of the inner insulating layer 120 in the longitudinal direction or along a longitudinal length of the inner insulating layer 120, so as to provide electromagnetic or signal shielding function for the conductors 110. The presence of the inner insulating layer 120 may prevent the conductive shielding layer 130 from entering the gap between the conductors 110.

For example, the conductive shielding layer 130 may be bonded to the outer peripheral surface of the inner insulating layer 120 by hot-melt or by the adhesive. Exemplarily, the conductive shielding layer 130 may include a conductive layer that is bonded to the inner insulating layer 120 by the adhesive, or there is filler between the conductive layer 130 and the inner insulating layer 120, which may further improve the robustness of the cable. As an example, the conductive layer of the conductive shielding layer 130 is made of aluminum or copper, which may be, for example, an aluminum/polypropylene tape. However, it will be appreciated by those skilled in the art that the present disclosure is not limited to this, and for example, the conductive shielding layer 130 may include a non-conductive matrix and conductive particles in the non-conductive matrix.

As shown in FIGS. 1-4, the conductive shielding layer 130 includes a first conductive shielding half 131 and a second conductive shielding half 132 as the two diametrically opposed circumferential halves, and the first conductive shielding half 131 and the second conductive shielding half 132 are formed, for example, in the form of half-loops facing each other, and joined to each other at positions at ends of the half-loops to form a closed loop circumferentially surrounding the inner insulating layer 120.

The two circumferential ends of the first conductive shielding half 131 or the second conductive shielding half 132 are spaced apart from each other on the outer circumferential surface of the inner insulating layer 120 in the circumferential direction, for example, they may be located at positions on different sides of the inner insulating layer 120, respectively.

In the embodiment shown in FIGS. 1-4, the first conductive shielding half 131 and the second conductive shielding half 132 have portions (1311, 1321; 1312; 1322) overlapping with each other on the outer peripheral surface of the inner insulating layer 120 to form a complete shielding closed loop, thereby further improving the electromagnetic shielding effect, and there is no seam or gap between the ends of the first conductive shielding half 131 and the second conductive shielding half 132, which can avoid a problem that a complete shielding loop cannot be formed because the seam becomes larger during use of the cable in a bent state. For example, a portion 1311 of the circumferential end of the first conductive shielding half 131 and a corresponding portion 1321 of the circumferential end of the second conductive shielding half 132 are at least partially overlapping with each other in the diametrical direction at a position on one side of the outer circumferential surface of the inner insulating layer 120, and a portion 1312 of the opposite circumferential end of the first conductive shielding half 131 and a corresponding portion 1322 of the circumferential end of the second conductive shielding half 132 are at least partially overlapping with each other in the diametrical direction at a position on another side (e.g., the opposite side) of the outer circumferential surface of the inner insulating layer 120.

Figure 2:
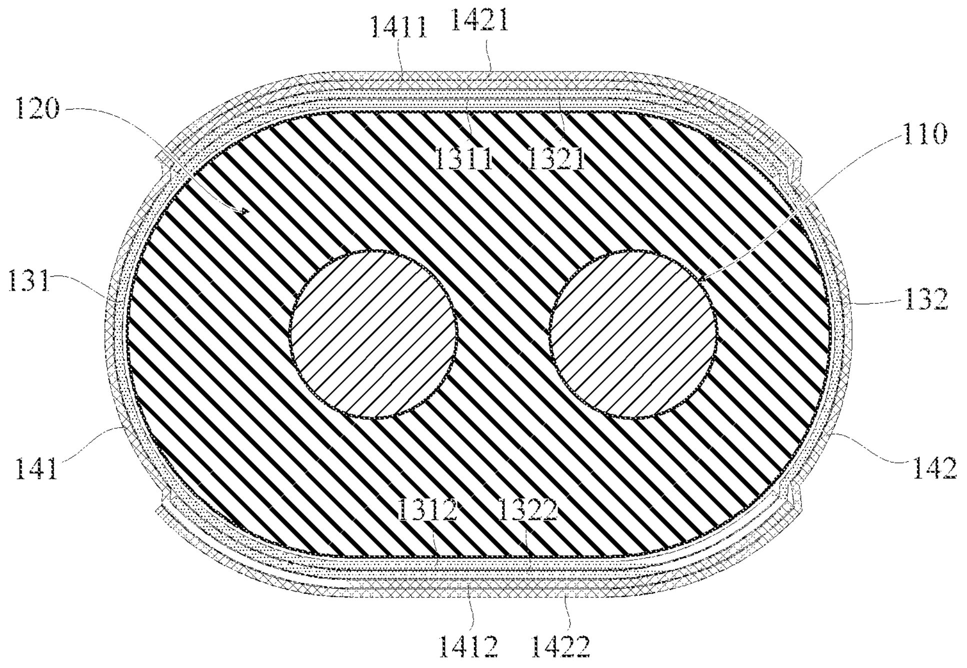
FIG. 2 is a radial sectional view of a cable according to another embodiment.
Figure 3:
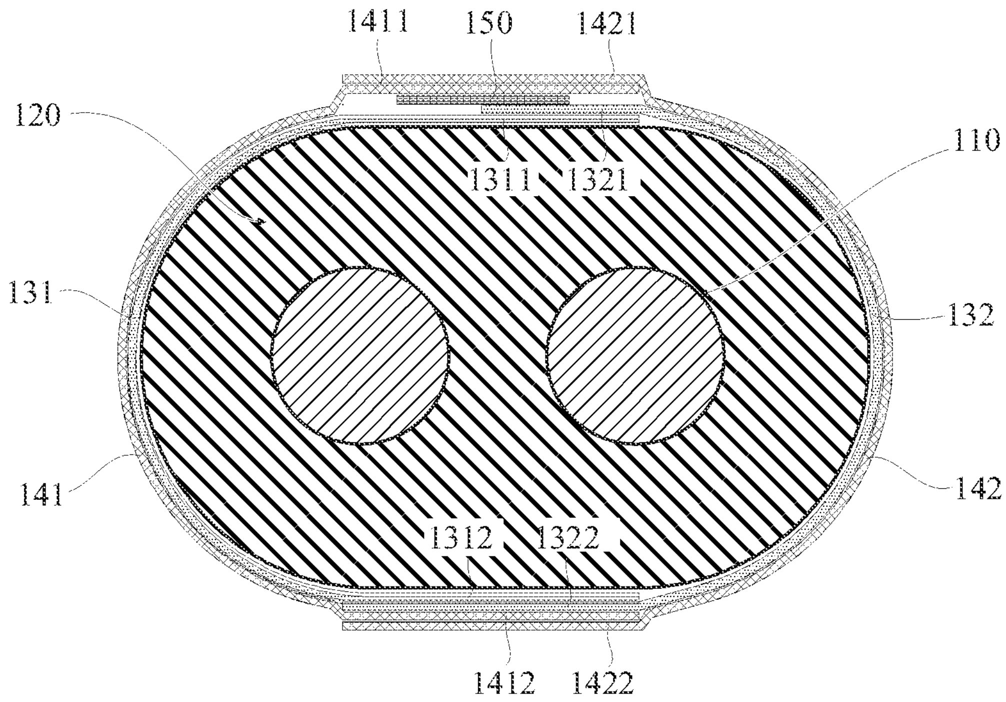
FIG. 3 is a radial sectional view of a cable according to another embodiment.
Figure 4:
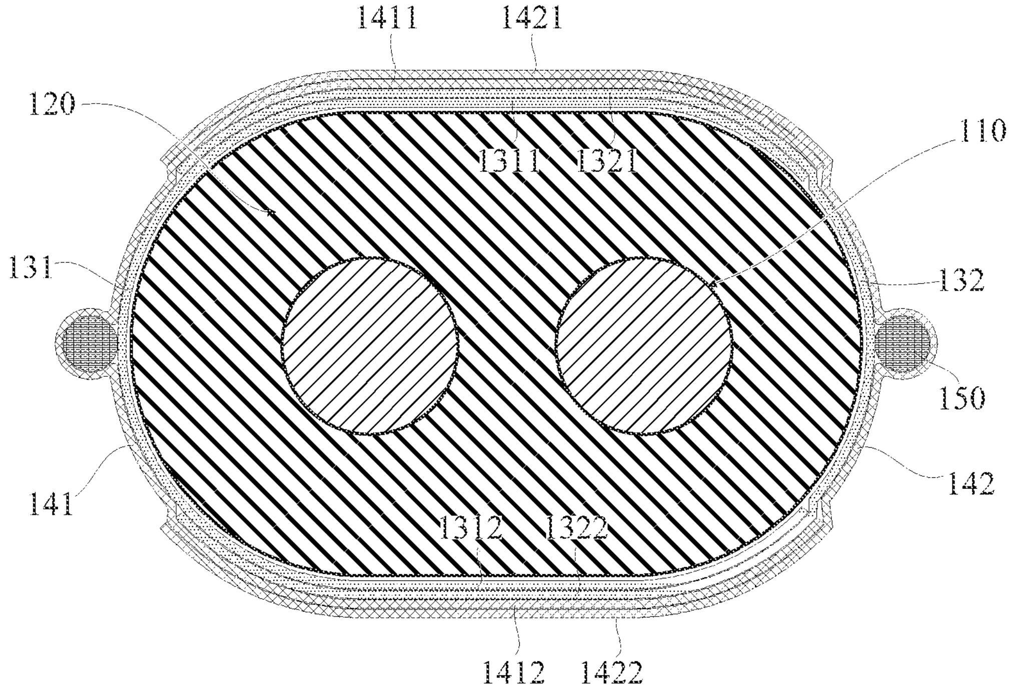
FIG. 4 is a radial sectional view of a cable according to another embodiment.

Portions of the first conductive shielding half 131 and the second conductive shielding half 132 overlapping with each other may be flat portions (e.g., see FIGS. 1 and 3), or may comprise a flat portion and a curved portion (e.g., FIGS. 2 and 4).

As shown in FIGS. 1-4, the outer insulating layer 140 comprises a first outer insulating half 141 and a second outer insulating half 142 as the two diametrically opposed circumferential halves, and the first outer insulating half 141 and the second outer insulating half 142 are formed, for example, in the form of half-loops facing each other, and joined to each other at positions at ends of the half-loops to form a closed loop circumferentially surrounding the conductive shielding layer 130.

The two circumferential ends of the first outer insulating half 141 or the second outer insulating half 142 are spaced apart from each other on the outer circumferential surface of the conductive shielding layer 130 in the circumferential direction, for example, they may be located at positions on different sides of the conductive shielding layer 130, respectively.

As shown in FIGS. 1-4, the first outer insulating half 141 and the second outer insulating half 142 have portions (1411, 1421; 1412; 1422) overlapping with each other on the outer peripheral surface of the conductive shielding layer 130 to form a complete closed loop. For example, a portion 1411 of the circumferential end of the first outer insulating half 141 and a corresponding portion 1421 of the circumferential end of the second outer insulating half 142 are at least partially overlapping with each other in the diametrical direction at a position on one side of the outer circumferential surface of the conductive shielding layer 130, and a portion 1412 of the opposite circumferential end of the first outer insulating half 141 and a corresponding portion 1422 of the circumferential end of the second outer insulating half 142 are at least partially overlapping with each other in the diametrical direction at a position on another side (e.g., the opposite side) of the outer circumferential surface of the conductive shielding layer 130.

Portions of the first outer insulating half 141 and the second outer insulating half 142 overlapping with each other may be flat portions (e.g., see FIGS. 1 and 3), or may comprise a flat portions and a curved portion (e.g., see FIGS. 2 and 4). In some examples, the overlapping portions of the first outer insulating half 141 and the second outer insulating half 142 and the overlapping portions of the first conductive shielding half 131 and the second conductive shielding half 132 may also be overlapped with each other or are located at approximately the same location, respectively. According to some embodiments of the present disclosure, each of the conductive shielding layer 130 and the outer insulating layer 140 adopts a semi-longitudinal wrapping structure, which can keep the overlapping positions fixed, and can avoid or eliminate burrs caused by unfixed or changed overlapping positions in the conventional cable when removing excessive materials (e.g., removing aluminum foil by laser).

In some embodiments of the present disclosure, the conductive shielding layer 130 may be adapted to be electrically connected to an external ground to function as a ground wire. For example, a conductive surface of the conductive shielding layer may face outward, that is, face the outer insulating layer, which facilitates the electrical connection between the conductive shielding layer and the external ground, and thereby better improving the shielding effect. Alternatively or additionally, as shown in FIGS. 3 and 4, the cable may also comprises a separate ground wire, such as at least one ground wire 150 provided between the conductive shield layer 130 and the outer insulating layer 140.

In the embodiment illustrated in FIG. 3, the ground wire 150 is provided at the aforementioned overlapping portions ((1311, 1321; 1312; 1322) of the conductive shielding layer 130 and the aforementioned overlapping portions (1411, 1421; 1412; 1422) of the outer insulating layer 140, for example in the form of a layer or film. In FIG. 4, two ground wires 150 are provided, and they are for example provided on diametrically opposed sides of the inner insulating layer 120, and are arranged between the first conductive shielding half 131 of the conductive shielding layer 130 and the corresponding first outer insulating half 141 of the outer insulating layer 140, and between the second conductive shielding half 132 of the conductive shielding layer 130 and the corresponding second outer insulating half 142 of the outer insulating layer 140, respectively. According to the embodiments of the present disclosure, the conventional wrapping structure is removed, and instead, the semi-longitudinal wrapping structure is adopted, and the ground wires 150 on either side of the cable is fixed on its center line by the mold, so as to prevent the ground wires 150 from displacing otherwise caused by a wrapping force of a wrapping tape in the wrapping structure.

As an example of manufacturing the cable, an inner insulating layer 120 is formed over the conductor 110 (for example, a single extruded layer is extruded over the conductor 110 by a single extrusion step), and a first conductive or metal layer or tape is semi-longitudinally wrapped around one side of the inner insulating layer 120 so as to be used as the first conductive shielding half 131 of the conductive shielding layer 130, and then a second conductive or metal layer or tape is semi-longitudinally wrapped around the other side of the inner insulating layer 120 so as to be used as the second conductive shielding half 132 of the conductive shielding layer 130. Then, a first insulating layer or tape is semi-longitudinally wrapped around an outside of the first or the second conductive or metal layer or tape so as to be used as the first outer insulating half 141 of the outer insulating layer 140, and finally, a second insulating layer or tape is semi-longitudinally wrapped around an outside of the second or the first conductive or metal layer or tape so as to be used as the second outer insulating half 142 of the outer insulating layer 140. All four layers or tapes (i.e., halves) can have hot melt adhesive and a side where the hot melt adhesive is located faces inward, so that the tapes or layers are thermally bonded to the internal structure upon each semi-longitudinal wrapping. In the case of setting the ground wires 150, one ground wire 150 can be added when semi-longitudinal wrapping the first insulating layer or tape, and another ground wire 150 can be added when semi-longitudinal wrapping the second insulating layer or tape, and the ground wire 150 is in contact with the conductive shielding layer 130.

Figure 5:
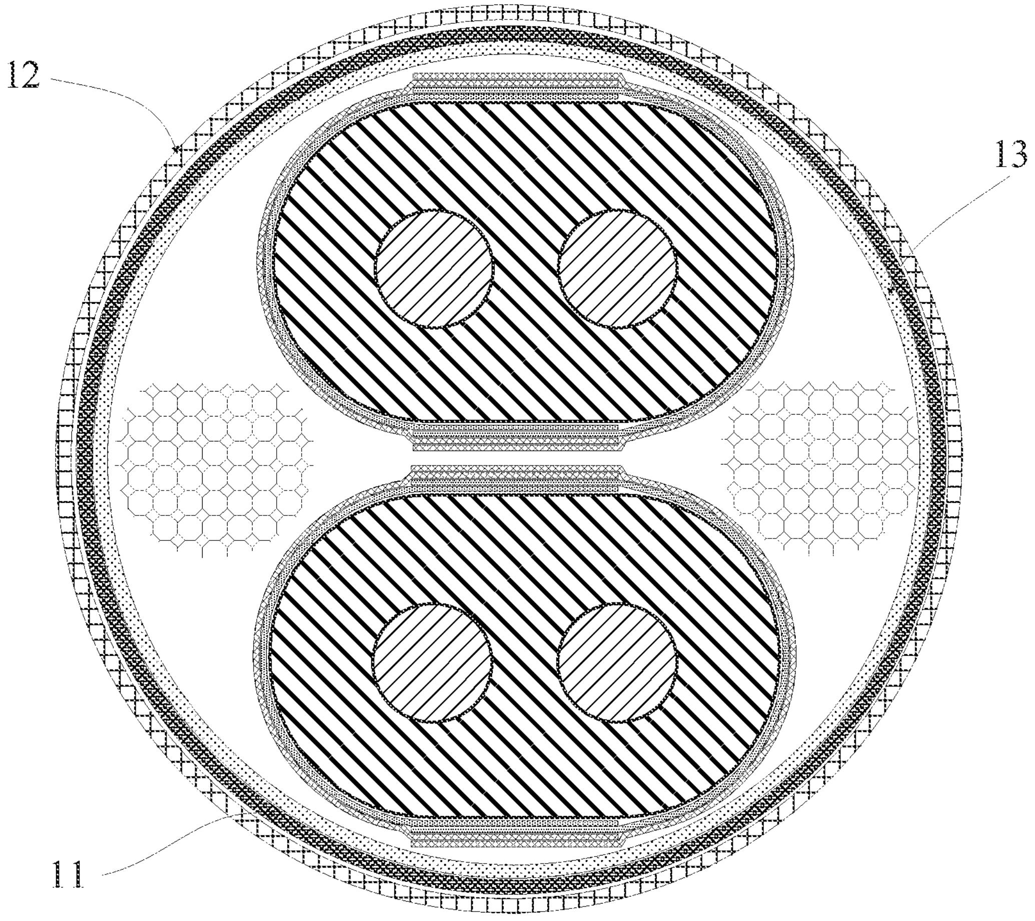
FIG. 5 is a radial sectional view of a cable assembly according to an embodiment.

According to an embodiment of the present disclosure, there is also provided a cable assembly, as shown in FIG. 5, the cable assembly comprising at least two cables described herein, which may be disposed within an outer sleeve 12. For example, these cables may be twisted or wound with respect to each other in the longitudinal direction. The number of cables of the cable assembly can be two or more, so that more signal, data or power transmission functions can be provided, and there is no signal interference between the cables.

The outer sleeve 12 can be in the form of a sheath, such as a metal tube or a plastic tube, to provide some protection. As shown, the cable assembly also comprises a conductive shielding structure 11 provided within the outer sleeve 12, and the conductive shielding structure 11 may take the form of a layer/tape of metal or other conductive material and wrapped or wound around an outside of the all cables to provide improved electromagnetic shielding effect.

In some examples, as shown in FIG. 5, the cable assembly may further comprise a buffering layer 13 provided between all the cables and the conductive shielding structure 11 to provide external force buffering or vibration damping function for the cables. In other examples, a space between the cables and/or a space between the cables and the buffering layer 13 or the shielding layer 11 may be at least partially filled with the filler.

Although the above embodiments of the present disclosure have been shown and described, it would be appreciated by those skilled in the art that various changes or modifications may be made to these embodiments without departing from the principles and spirit of the disclosure, the scope of which is defined by the appended claims and their equivalents. It should be noted that, the terms "comprise", "include" and "have" as used herein doesn't exclude other elements or steps.

What is claimed is:

1. A cable, comprising:

a pair of conductors extending longitudinally and spaced apart from each other;

an inner insulating layer circumferentially wrapped around an outside of the conductors and fixing the conductors;

a conductive shielding layer circumferentially wrapped around an outside of the inner insulating layer; and an outer insulating layer circumferentially wrapped around an outer peripheral surface of the conductive shielding layer, the outer insulating layer has a pair of diametrically opposed circumferential halves including a first outer insulating half and a second outer insulating half, each of the first outer insulating half and the second outer insulating half surrounding a part of a circumference of the inner insulating layer and extending longitudinally, the first outer insulating half and the second outer insulating half are joined to each other to form a closed loop circumferentially surrounding the conductive shielding layer.

2. The cable according to claim 1, wherein each circumferential half circumferentially surrounds at least half of the circumference of the inner insulating layer, the diametrically opposed circumferential halves together surround an entirety of the circumference of the inner insulating layer.

3. The cable according to claim 2, wherein the conductive shielding layer has a first conductive shielding half and a second conductive shielding half as another pair of diametrically opposed circumferential halves, the first conductive shielding half and the second conductive shielding half are joined to each other to form a closed loop circumferentially surrounding the inner insulating layer.

4. The cable according to claim 1, wherein each diametrically opposed circumferential half is a continuous layer extending longitudinally.

5. The cable according to claim 1, wherein the diametrically opposed circumferential halves at least partially overlap in a circumferential direction of the inner insulating layer to form a closed loop.

6. The cable according to claim 5, wherein the diametrically opposed circumferential halves partially overlap on a pair of diametrically opposed sides of the inner insulating layer.

7. The cable according to claim 5, wherein the conductive shielding layer has a first conductive shielding half and a second conductive shielding half as another pair of diametrically opposed circumferential halves, the first conductive shielding half and the second conductive shielding half are joined to each other to form a closed loop circumferentially surrounding the inner insulating layer.

8. The cable according to claim 1, wherein the conductive shielding layer includes a first conductive shielding half and a second conductive shielding half as another pair of diametrically opposed circumferential halves, the first conductive shielding half and the second conductive shielding half are joined to each other to form a closed loop circumferentially surrounding the inner insulating layer.

9. The cable according to claim 8, wherein a pair of circumferential ends of each of the first conductive shielding half and the second conductive shielding half are located on different sides of the inner insulating layer.

10. The cable according to claim 8, wherein the first conductive shielding half and the second conductive shielding half overlap with each other on an outer peripheral surface of the inner insulating layer.

11. The cable according to claim 10, wherein a plurality of overlapping portions of the first conductive shielding half and the second conductive shielding half are flat or include a flat portion and a curved portion.

12. The cable according to claim 1, wherein a pair of circumferential ends of each of the first outer insulating half and the second outer insulating half are respectively located on different sides of the conductive shielding layer.

13. The cable according to claim 1, wherein the first outer insulating half and the second outer insulating half overlap with each other on the outer peripheral surface of the conductive shielding layer.

14. The cable according to claim 13, wherein a plurality of overlapping portions of the first outer insulating half and the second outer insulating half are flat or include a flat portion and a curved portion.

15. The cable according to claim 1, wherein:

the conductive shielding layer is electrically connected to an external ground; and/or further comprising a ground wire provided between the conductive shielding layer and the outer insulating layer.

16. The cable according to claim 1, wherein the inner insulating layer is a single extruded layer circumferentially wrapping around the conductors along a longitudinal length of the conductors.

17. A cable assembly, comprising:

a pair of cables, each cable is the cable according to claim 1;

a conductive shielding structure wrapped around the cables; and an outer sleeve sleeved on an outer peripheral surface of the conductive shielding structure.

18. The cable assembly according to claim 17, further comprising a buffering layer and/or a filler provided between the cables and the conductive shielding structure.

19. A cable, comprising:

a pair of conductors extending longitudinally and spaced apart from each other;

an inner insulating layer circumferentially wrapped around an outside of the conductors and fixing the conductors;

a conductive shielding layer circumferentially wrapped around an outside of the inner insulating layer; and an outer insulating layer circumferentially wrapped around an outer peripheral surface of the conductive shielding layer, at least one of the conductive shielding layer and the outer insulating layer includes a pair of diametrically opposed circumferential halves, each circumferential half surrounding a part of a circumference of the inner insulating layer and extending longitudinally, the pair of diametrically opposed circumferential halves are joined to each other on each of a pair of diametrically opposed sides of the inner insulating layer to form a closed loop circumferentially surrounding the conductive shielding layer.

20. The cable according to claim 19, wherein the diametrically opposed circumferential halves partially overlap on each of the pair of diametrically opposed sides of the inner insulating layer.

* * * * *